(12) United States Patent
Bogner et al.

(10) Patent No.: US 9,567,870 B2
(45) Date of Patent: Feb. 14, 2017

(54) TURBOCHARGER WITH COOLED TURBINE HOUSING, COOLED BEARING HOUSING, AND A COMMON COOLANT SUPPLY

(75) Inventors: Mathias Bogner, Neutraubling (DE); Marc Hiller, Morschheim (DE); Ralph-Maurice Koempel, Mannheim (DE)

(73) Assignee: Continental Automotive GmbH, Hannover (DE)

( * ) Notice: Subject to any disclaimer, the term of this patent is extended or adjusted under 35 U.S.C. 154(b) by 650 days.

(21) Appl. No.: 13/984,894

(22) PCT Filed: Feb. 8, 2012

(86) PCT No.: PCT/EP2012/052115
§ 371 (c)(1),
(2), (4) Date: Aug. 12, 2013

(87) PCT Pub. No.: WO2012/107481
PCT Pub. Date: Aug. 16, 2012

(65) Prior Publication Data
US 2013/0323021 A1 Dec. 5, 2013

(30) Foreign Application Priority Data
Feb. 10, 2011 (DE) ........................ 10 2011 003 901

(51) Int. Cl.
| | | |
|---|---|---|
| F02B 39/00 | (2006.01) | |
| F04D 29/58 | (2006.01) | |
| F01D 25/14 | (2006.01) | |
| F02C 6/12 | (2006.01) | |
| F04D 29/42 | (2006.01) | |

(52) U.S. Cl.
CPC ............... *F01D 25/14* (2013.01); *F02C 6/12* (2013.01); *F04D 29/4206* (2013.01); *F04D 29/584* (2013.01); *F02B 39/005* (2013.01); *F05D 2260/232* (2013.01)

(58) Field of Classification Search
CPC .... F01D 25/14; F04D 26/4206; F04D 29/584; F05D 2260/232; F02C 6/12; F02B 39/005
USPC ..... 415/180, 200, 205, 110, 116, 145, 170.1
See application file for complete search history.

(56) References Cited

U.S. PATENT DOCUMENTS

| | | |
|---|---|---|
| 8,459,024 B2 | 6/2013 | Koch |
| 2004/0083730 A1 | 5/2004 | Wizgall et al. |
| 2004/0200215 A1* | 10/2004 | Woollenweber ........ F01D 15/10 60/407 |
| 2010/0296920 A1 | 11/2010 | Koch |
| 2011/0008158 A1 | 1/2011 | Boening et al. |

FOREIGN PATENT DOCUMENTS

| | | |
|---|---|---|
| CN | 101960099 A | 1/2011 |
| DE | 3235538 A1 | 3/1984 |
| DE | 102008011258 A1 | 9/2009 |
| WO | 2009019153 A2 | 2/2009 |
| WO | 2010009945 A2 | 1/2010 |

* cited by examiner

*Primary Examiner* — Audrey K Bradley
*Assistant Examiner* — Dapinder Singh
(74) *Attorney, Agent, or Firm* — Laurence A. Greenberg; Werner H. Stemer; Ralph E. Locher

(57) ABSTRACT

A turbocharger has a turbine housing and a bearing housing that is connected to the turbine housing. Coolant is supplied to the bearing housing via the turbine housing.

8 Claims, 2 Drawing Sheets

TURBOCHARGER WITH COOLED TURBINE HOUSING, COOLED BEARING HOUSING, AND A COMMON COOLANT SUPPLY

BACKGROUND OF THE INVENTION

Field of the Invention

The invention relates to an exhaust-gas turbocharger which has a cooled turbine housing.

Exhaust-gas turbochargers serve for improving the efficiency of an internal combustion engine and thus increasing the power thereof. For this purpose, the exhaust-gas turbocharger has a turbine with a turbine wheel and has a compressor with a compressor wheel, wherein the two rotor wheels are arranged on a common shaft. Here, the turbine wheel is driven by an exhaust-gas mass flow from a connected internal combustion engine, and in turn drives the compressor wheel. The compressor compresses inducted fresh air and conducts said fresh air to the internal combustion engine. The common shaft is mounted in a bearing housing of the turbocharger. Furthermore, the turbine wheel of the turbine is arranged in a turbine housing, and the compressor wheel of the compressor is arranged in a compressor housing.

An exhaust-gas turbocharger of said type must satisfy a wide variety of requirements during operation on the internal combustion engine or on an engine connected thereto. One of said requirements consists in accommodating the high temperatures which can arise in the turbocharger housing for example owing to the hot exhaust-gas mass flow.

Here, the conventional construction of an exhaust-gas turbocharger provides individual housings which are composed in each case of a material suited to the temperature prevailing there. Here, the compressor housing is normally composed of aluminum, whereas the bearing housing is composed of cast iron. The turbine housing is generally composed, owing to the high temperatures that prevail in said region, of high-temperature-resistant nickel alloys. Owing to the different, suited materials for the individual housings, said housings are formed as separate parts which are connected to one another and which must furthermore be sealed off with respect to one another.

Both the bearing housing and also the turbine housing may be of water-cooled design, wherein the cooling circuits of the bearing housing and turbine housing are realized independently of one another. Consequently, it is necessary for the bearing housing and the turbine housing to be supplied with cooling water via separate lines. Here, in each case one water feed line and in each case one water discharge line is required.

BRIEF SUMMARY OF THE INVENTION

It is the object of the invention to specify an exhaust-gas turbocharger with improved cooling.

Said object is achieved by means of an exhaust-gas turbocharger having the features as claimed. Advantageous embodiments and refinements of the invention are specified in the dependent claims.

According to the present invention, an exhaust-gas turbocharger has a turbine housing and a bearing housing connected to the turbine housing, wherein the turbine housing has a coolant inlet, a cooling jacket provided in the interior of the turbine housing, and a coolant outlet, the bearing housing has a coolant inlet, a cooling jacket provided in the interior of the bearing housing, and a coolant outlet, a coolant inlet duct is provided within the turbine housing between the coolant inlet and the cooling jacket, a coolant branch duct branches off from the coolant inlet duct, said coolant branch duct being connected to the coolant inlet of the bearing housing, a coolant outlet duct is provided within the turbine housing between the cooling jacket and the coolant outlet, a coolant return duct provided within the turbine housing is connected to the coolant outlet of the bearing housing, and the coolant return duct issues into the coolant outlet duct which is provided in the turbine housing between the cooling jacket and the coolant outlet.

The advantages of an exhaust-gas turbocharger of said type consist in that it requires fewer components and less installation space than known exhaust-gas turbochargers and can therefore be of more compact construction than known exhaust-gas turbochargers. In particular, it requires only one coolant supply line between the coolant source, which is for example the cooling circuit of the internal combustion engine, and the exhaust-gas turbocharger, and also only one coolant return line to the cooling circuit of the internal combustion engine.

Further advantageous characteristics of the invention will emerge from the explanation thereof below on the basis of the figures, in which:

DESCRIPTION OF THE INVENTION

Figure 1:
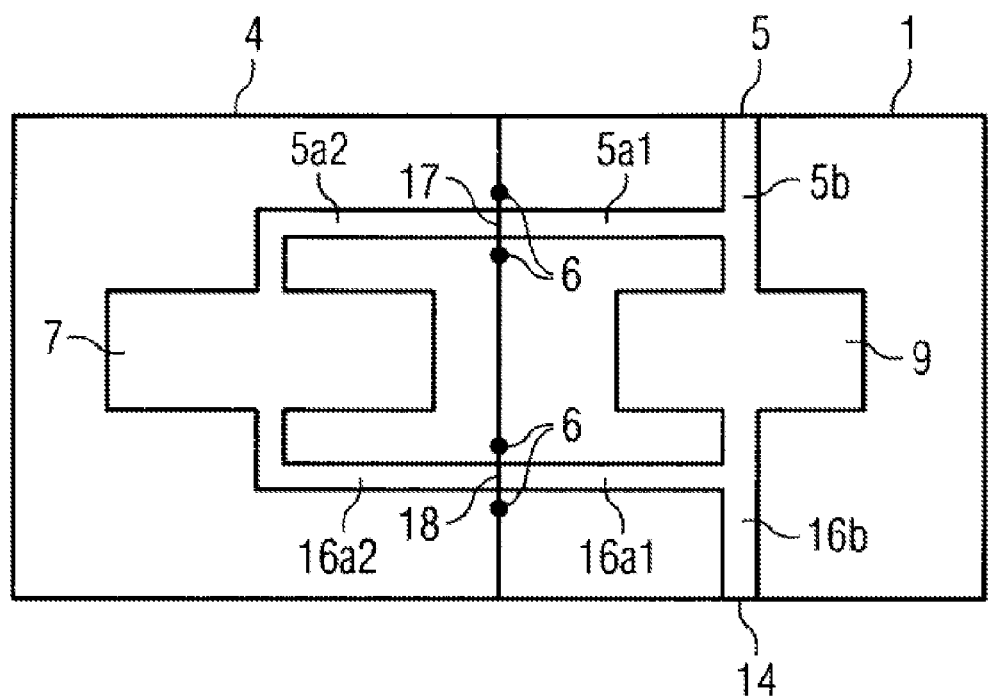
FIG. 1 is a sketch for the basic explanation of the cooling system of an exhaust-gas turbocharger according to the invention.

FIG. 1 is a sketch for the basic explanation of the cooling system of an exhaust-gas turbocharger according to the invention.

An exhaust-gas turbocharger according to the invention has a turbine housing 1 and a bearing housing 4 connected to the turbine housing. The turbine housing 1 has a coolant inlet 5 through which cooling water is supplied to the turbine housing during the operation of the exhaust-gas turbocharger. Said cooling water is provided for example from the cooling circuit of the internal combustion engine.

Furthermore, the turbine housing 1 has a coolant outlet 14 through which cooling water is discharged during the operation of the exhaust-gas turbocharger. Said cooling water which is discharged from the turbine housing is for example returned to the cooling circuit of the internal combustion engine.

Furthermore, a cooling jacket 9 is provided in the interior of the turbine housing 1, within which cooling jacket coolant is transported during the operation of the exhaust-gas turbocharger in order to provide adequate cooling of constituent parts of the turbine housing, in particular the wastegate flap seat and the turbine spiral.

The coolant inlet 5 is connected to the cooling jacket 9 via a coolant inlet duct 5b. The coolant outlet 14 is connected to the cooling jacket 9 via a coolant outlet duct 16b.

A turbine-housing-side coolant branch duct 5a1 branches off from the coolant inlet duct 5b provided between the coolant inlet 5 and the cooling jacket 9. Said coolant branch duct extends to an outlet of the turbine housing and, there, is connected directly to a coolant inlet 17 of the bearing housing 4. A seal 6, which is preferably an O-ring or a bead-type seal, is provided between the bearing housing and the turbine housing in the region of the coolant inlet 17 of the bearing housing 4.

Furthermore, a coolant outlet duct 16b is provided within the turbine housing 1 between the cooling jacket 9 and the coolant outlet 14.

A turbine-housing-side coolant return duct 16a1 opens into this coolant outlet duct 16b, the other end portion of which coolant return duct extends to the outer edge of the turbine housing and, there, is connected directly to the coolant outlet 18 of the bearing housing. A further seal 6, which is preferably likewise an O-ring or a bead-type seal, is provided between the bearing housing and the turbine housing in the region of the coolant outlet 18 of the bearing housing 4.

The coolant inlet 17 of the bearing housing 4 is connected, within the bearing housing, to the cooling jacket 7 of the bearing housing via a bearing-housing-side coolant inlet duct 5a2. During operation of the exhaust-gas turbocharger, coolant is transported through said cooling jacket 7 in order to provide adequate cooling of constituent parts of the bearing housing, in particular the bearing elements and sealing elements.

The cooling jacket 7 of the bearing housing 4 is connected to the coolant outlet 18 of the bearing housing via a bearing-housing-side coolant outlet duct 16a2.

Consequently, during operation of the exhaust-gas turbocharger, coolant is received via the coolant inlet 5 of the turbine housing 1. Said coolant is divided, within the turbine housing, into a first coolant stream, which is used for cooling components of the turbine housing, and a second coolant stream. Said second coolant stream is supplied via the turbine-housing-side coolant branch duct 5a1 to the coolant inlet 17 of the bearing housing 4, enters there into the bearing-housing-side coolant inlet duct 5a2, is conducted through the latter to the cooling jacket 7 of the bearing housing, and is used there for cooling components of the bearing housing. The second coolant stream which exits the cooling jacket 7 of the bearing housing is conducted via the bearing-housing-side coolant outlet duct 16a2 to the coolant outlet 18 of the bearing housing, and enters there into the turbine-housing-side coolant return duct 16a1. Finally, within the turbine housing, in the region of the coolant outlet duct 16b, the first coolant stream exiting the cooling jacket 9 of the turbine housing and the second coolant stream returned from the bearing housing via the coolant return duct 16a1 are merged again. The merged coolant stream is discharged through the coolant outlet 14 of the turbine housing and is returned to the cooling circuit of the internal combustion engine.

That having been said, in the exemplary embodiment described above, the supply and discharge of coolant to and from the bearing housing takes place not via dedicated lines of the bearing housing but rather via the turbine housing. Said turbine housing is connected to the bearing housing, for example by means of screws. Coolant for the bearing housing is branched off within the turbine housing. Within the turbine housing, the coolant returned from the bearing housing is merged again with the coolant discharged from the cooling jacket of the turbine housing.

Said branching off of the coolant preferably takes place directly upstream of the cooling jacket 9 of the turbine housing, and said merging of the coolant preferably takes place directly downstream of the cooling jacket.

One advantage of the above-described embodiment of the cooling system of an exhaust-gas turbocharger consists in that the cross sections of the feed lines and return lines for the coolant can be configured as defined throttle cross sections. Said configuration is advantageously carried out such that coolant build-up effects in the turbine housing are avoided, and such that the pressure conditions of the coolant are set such that a defined coolant volume stream is branched off.

If the coolant branch is positioned within the region of the cooling jacket 9 of the turbine housing, in particular in the region of the cooling jacket of the turbine wheel, the changing flow conditions would result in an undefined coolant branch flow to the bearing housing.

Figure 2:
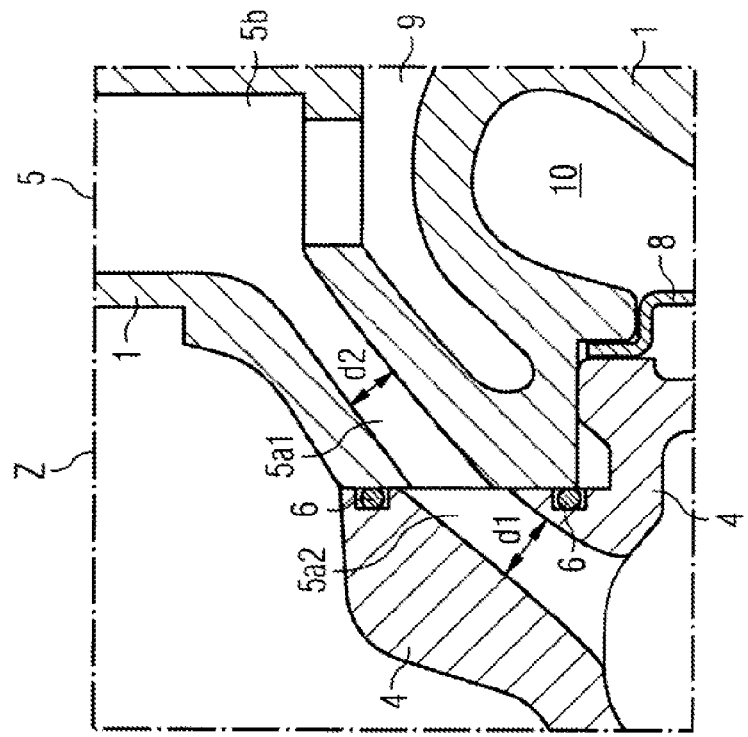
FIG. 2 shows more detailed illustrations of parts of an exhaust-gas turbocharger according to the invention.
Figure 2:
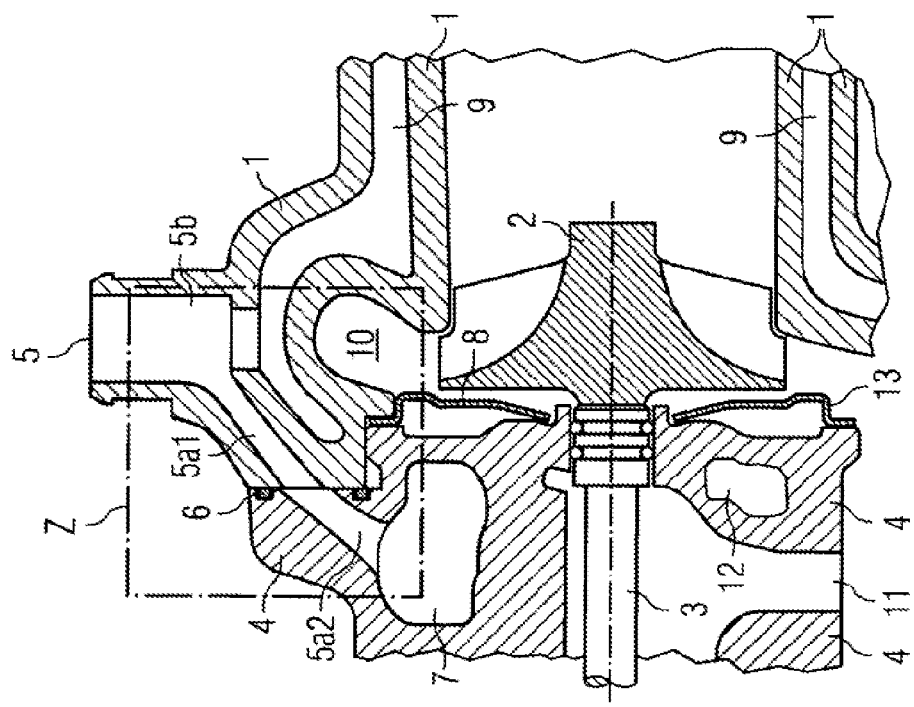

FIG. 2 shows more detailed illustrations of parts of an exhaust-gas turbocharger according to the invention. Here, the left-hand part of FIG. 2 shows a part of the turbine housing 1 and a part of the bearing housing 4 directly connected to the turbine housing, and the right-hand part of FIG. 2 shows the detail Z from the left-hand part in an enlarged illustration.

It can be seen from FIG. 2 that the coolant entering through the coolant inlet 5 of the turbine housing 1 is divided in the region of a coolant inlet duct 5b into a first coolant stream and a second coolant stream. The first coolant stream is supplied to the cooling jacket 9 of the turbine housing. The second coolant stream is supplied via a turbine-housing-side coolant branch duct 5a1 and a bearing-housing-side coolant inlet duct 5a2 to the cooling jacket 7 of the bearing housing 4.

A seal 6 is provided in the transition region of the coolant from the turbine housing 1 to the bearing housing 4 which is for example screwed to the turbine housing, which seal seals off said transition region. Furthermore, it can be seen from FIG. 2 that the diameter d1 of the bearing-housing-side coolant inlet duct 5a2 is greater than the diameter d2 of the turbine-housing-side coolant branch duct 5a1. The branch duct as a whole is thus broader in the flow direction of the coolant. This has the advantage that an offset caused by any component tolerances is compensated.

FIG. 2 also shows the turbine wheel 2 provided in the turbine housing, the common shaft 3, a heat shield 8, a cavity 10 of the turbine spiral, an oil return line 11 provided in the bearing housing, and a further heat shield 13.

Also, in the coolant return duct not shown in FIG. 2, the duct cross section may increase in the flow direction of the coolant, such that the turbine-housing-side coolant return duct has a greater diameter than the bearing-housing-side coolant outlet duct.

The invention claimed is:

1. An exhaust-gas turbocharger, comprising:
   a turbine housing formed with a coolant inlet, a cooling jacket inside said turbine housing, and a coolant outlet;
   a bearing housing connected to said turbine housing, said bearing housing having a coolant inlet, a cooling jacket inside said bearing housing, and a coolant outlet;
   a coolant inlet duct formed inside said turbine housing between said coolant inlet and said cooling jacket in said turbine housing;
   a coolant branch duct branching off from said coolant inlet duct and connected to said coolant inlet of said bearing housing, said coolant branch duct formed inside said turbine housing;
   a coolant outlet duct formed inside said turbine housing between said cooling jacket and said coolant outlet in said turbine housing;
   a coolant return duct formed inside said turbine housing and connected to said coolant outlet of said bearing housing; and said coolant return duct issuing into said coolant outlet duct formed inside said turbine housing between said cooling jacket and said coolant outlet thereof.

2. The exhaust-gas turbocharger according to claim 1, wherein said coolant outlet of said bearing housing is connected via a bearing-housing-side coolant outlet duct to said cooling jacket of said bearing housing.

3. The exhaust-gas turbocharger according to claim 1, wherein said bearing housing is formed with a bearing-housing-side coolant inlet duct connecting said coolant inlet of said bearing housing to said cooling jacket of said bearing housing.

4. The exhaust-gas turbocharger according to claim 3, wherein a cross-section (i.e., diameter d1) of said bearing-housing-side coolant inlet duct is greater than a cross-section (i.e., diameter d2) of said turbine-housing-side coolant branch duct.

5. The exhaust-gas turbocharger according to claim 1, which comprises a seal disposed between said bearing housing and said turbine housing in a vicinity of said coolant inlet of said bearing housing.

6. The exhaust-gas turbocharger according to claim 5, wherein said seal is a sealing ring or a bead-type seal.

7. The exhaust-gas turbocharger according to claim 5, which comprises a further seal disposed between said bearing housing and said turbine housing in a vicinity of said coolant outlet of said bearing housing.

8. The exhaust-gas turbocharger according to claim 7, wherein said seal and said further seal are seals selected from the group consisting of a sealing ring and a bead-type seal.

* * * * *